(12) United States Patent
Myers et al.

(10) Patent No.: US 10,173,277 B2
(45) Date of Patent: Jan. 8, 2019

(54) WORK TABLE FOR BAND SAW FOR USE IN VERTICAL OR HORIZONTAL SAW POSITION AND METHOD

(71) Applicant: JPW Industries Inc., LaVergne, TN (US)

(72) Inventors: Steven Myers, Buffalo Valley, TN (US); Charles Weber, Onalaska, WI (US)

(73) Assignee: JPW Industries Inc., Lavergne, TN (US)

( * ) Notice: Subject to any disclaimer, the term of this patent is extended or adjusted under 35 U.S.C. 154(b) by 0 days.

(21) Appl. No.: 15/176,474

(22) Filed: Jun. 8, 2016

(65) Prior Publication Data

US 2017/0355028 A1   Dec. 14, 2017

(51) Int. Cl.
*B23D 53/00* (2006.01)
*B27B 13/04* (2006.01)
*B23D 55/02* (2006.01)

(52) U.S. Cl.
CPC ......... *B23D 53/006* (2013.01); *B23D 55/023* (2013.01)

(58) Field of Classification Search
CPC ...... B23D 55/026; B23D 55/02; B23D 53/06; B23D 53/006
See application file for complete search history.

(56) References Cited

U.S. PATENT DOCUMENTS

| | | | |
|---|---|---|---|
| 502,887 A * | 8/1893 | Griffin | B23D 59/00 29/48.5 R |
| 2,827,085 A | 3/1958 | Ocenasek | |
| 2,928,439 A | 3/1960 | Tester | |
| 3,092,155 A | 6/1963 | Fowler et al. | |
| 3,452,629 A * | 7/1969 | Jacobson | B23D 53/001 83/812 |
| 3,799,024 A | 3/1974 | Alexander | |
| 3,884,106 A | 5/1975 | Aizawa | |
| 3,952,622 A | 4/1976 | Majus | |
| 4,055,102 A | 10/1977 | Stubbings | |
| 4,161,974 A | 7/1979 | Patterson | |
| 4,179,961 A | 12/1979 | Harris | |
| 4,677,887 A * | 7/1987 | Martin | B23D 55/02 30/374 |
| 4,823,666 A * | 4/1989 | Galloway | B23D 53/12 30/296.1 |
| 4,890,654 A | 1/1990 | Fox | |
| 5,107,738 A | 4/1992 | Aoyagi | |
| 5,305,673 A | 4/1994 | Costley | |
| 5,320,016 A | 6/1994 | Spath et al. | |
| 8,365,643 B2 | 2/2013 | Aihara et al. | |
| 2007/0221032 A1 | 9/2007 | Mangano | |
| 2011/0005364 A1 | 1/2011 | Liu et al. | |
| 2012/0055299 A1* | 3/2012 | McIntosh | B23D 53/006 83/13 |

FOREIGN PATENT DOCUMENTS

GB              662982 A        12/1951

* cited by examiner

*Primary Examiner* — Stephen Choi
(74) *Attorney, Agent, or Firm* — Waller Lansden Dortch & Davis, LLP; Blake M. Bernard

(57) ABSTRACT

A band saw that is convertible between a vertical cutting position and a horizontal cutting position includes a work table extension that extends from a work table when the band saw is used in the horizontal cutting position. The work table extension is removable from the work table and is attachable to a blade guide when the band saw is used in the vertical cutting position.

11 Claims, 5 Drawing Sheets

WORK TABLE FOR BAND SAW FOR USE IN VERTICAL OR HORIZONTAL SAW POSITION AND METHOD

CROSS REFERENCE TO RELATED APPLICATION

The present application incorporates by reference the disclosure of U.S. patent application entitled "Dual Position Blade Guide for Vertical or Horizontal Position of Band Saw", Application No. 15/176,736, filed Jun. 8, 2016, naming Steven Myers and Charles Weber as inventors, which application is being filed on the same date as the present application.

BACKGROUND OF THE INVENTION

Field of the Invention

The present invention relates generally to a band saw for use in a vertical or horizontal saw position, and more particularly to a work table and method that is used on a band saw in the vertical and horizontal saw position.

Description of the Related Art

Band saws are commonly used for cutting materials such as wood or metal using a band saw blade. The band saw blade is in the shape of a continuous loop of flexible steel with saw teeth formed along one edge of the band-shaped blade. The band saw blade is mounted onto two wheels of the band saw, one of which is driven by a motor. As the motor drives the wheel on which the band saw is mounted, the material to be cut is brought into contact with a length of the moving blade extending between the two wheels.

Some band saw tools are configured for vertical cutting with one wheel above the other wheel and the blade extending vertically between the wheels. The cutting portion of the blade is oriented vertically and is ordinarily held in a stationary position as the material to be cut is moved toward the blade. Other band saw tools are configured with the wheels side-by-side and the blade extending horizontally between the wheels. The cutting portion of the blade is oriented in a nearly horizontal position and ordinarily the cutting portion of the blade is moved against a stationary workpiece to be cut. A horizontal blade band saw may be referred to as a cut-off saw or chop saw. Horizontal blade band saws may have the axles of the wheels tilted at an angle from vertical so that the return portion of the blade remains above the work piece and does not limit the length of material to be cut. The cutting portion of the blade is twisted so that the width of the blade is vertical to permit a vertical cutting motion by the blade into the work piece.

Band saw tools are known that are convertible from a vertical blade configuration to a horizontal blade configuration by pivoting the wheels between the vertical cutting position and the horizontal cutting position.

SUMMARY OF THE INVENTION

The present invention provides a work table for a band saw that supports a work piece that is being cut by the band saw. The band saw is convertible to operate in either a vertical cutting position with the cutting portion of the blade extending in a vertical direction or a horizontal cutting position with the cutting portion of the blade extending in a generally horizontal direction. The work table may be mounted to support the work piece when the band saw is used in the vertical cutting position and may be mounted to support the work piece when the band saw is used in the horizontal cutting position. The work table may be moved between the positions for vertical cutting and horizontal cutting. The same work table may be used in both saw cutting positions.

The work table is mounted to the band saw using a bracket. The bracket mounts the work table to the saw when the saw is in the vertical cutting position. The same bracket mounts the work table to the saw when the saw is in the horizontal cutting position. The work table and bracket are easily configured by a user for either the vertical or horizontal cutting position.

DETAILED DESCRIPTION OF THE PREFERRED EMBODIMENTS

Figure 1:
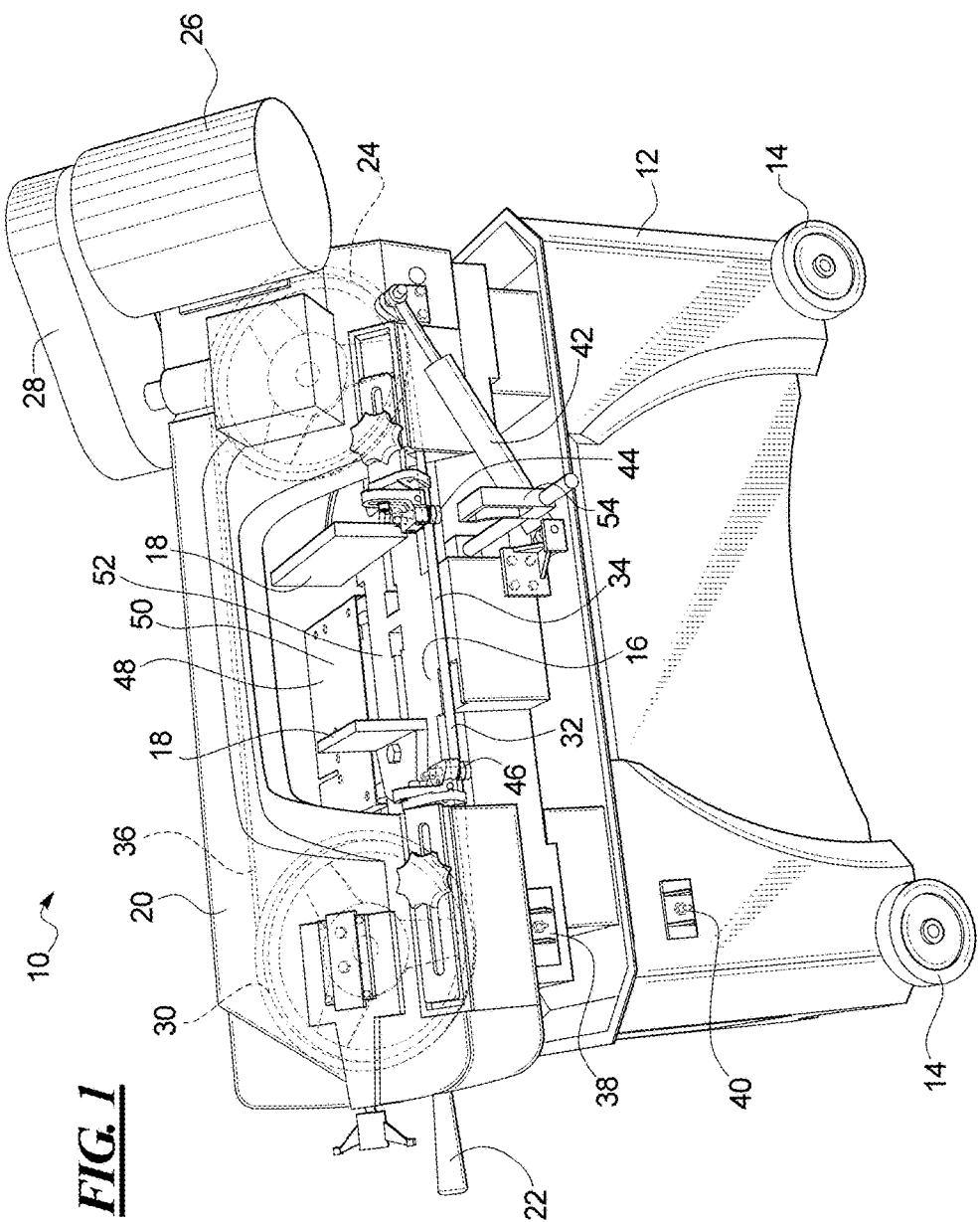
FIG. 1 is a top, front, left side perspective view of a band saw configured for use in a horizontal cutting position.

In FIG. 1, a band saw tool 10 has a base 12 mounted on wheels 14 for movement about a work area. The base 12 may also be provided without wheels for stationary use. On the base 12 is a stationary work table 16 with work piece guides 18 for aligning a work piece. A blade housing 20 is mounted for pivoting movement relative to the stationary work table 16. The blade housing 20 has a handle 22 that may be grasped by a user to move the blade housing 20 in the pivoting motion. Within the blade housing 20 is mounted a first wheel 24 that is driven by a motor 26 through a transmission 28. A second wheel 30 is mounted in the blade housing 20 spaced from the first wheel 24. A band saw blade 32 is mounted on the wheels 24 and 30 for movement as the wheels 24 and 30 rotate. The band saw blade 32 extends between the wheels 24 and 30 at a forward portion 34 and a return portion 36. The forward portion 34 is exposed for use in cutting work pieces and the return portion 36 is enclosed within the blade housing 20.

To provide clearance for longer work pieces, the return portion 36 of the blade 32 and the portion of the blade housing 20 that encloses the return portion 36 are spaced above the stationary work table 16 even when the forward portion 34 of the blade 32 is at the stationary work table 16. This permits longer work pieces to be positioned under the blade housing 20 and return portion 36 when the work piece is being cut by the forward portion 34 of the band saw blade 32. The spacing is accomplished by tilting the rotating plane of the wheels 24 and 26 and the blade housing 20 at an angle relative to the stationary work table 16.

The blade housing 20, the wheels 24 and 30, the band saw blade 32 and the motor 26 are pivotable about an axis that is parallel to the stationary work table 16. To use the band saw tool 10 in the horizontal blade position, a work piece is placed on the stationary work table 16. The blade housing 20, motor 26 and blade 32 are pivoted up to a position with the forward portion 34 of the band saw blade above the work piece, for example using the handle 22 to move the blade housing 20 to the pivoted-up position. The work piece is moved to a position with the desired cut location beneath the forward portion 34 of the blade 32. A power switch 38 is provided on the stationary work table 16 to control power to the motor 26. A further power switch 40 is provided on the base 12 to control the motor or for other features. The further power switch 40 may be provided in addition or instead of the power switch 38.

The user operates the switch 38 or 40 to power up the motor 26 which drives the blade 32. The motor 26 may be powered up before or after pivoting the blade housing 20 to the up position. The user pivots the forward portion 34 of the blade 32 downward onto the work piece to cut the work piece using the moving forward portion 34 of the blade 32. Continuing the downward pivoting movement of the blade housing 20 cuts into and possibly through the work piece. The band saw tool 10 has a cylinder 42, such as a pneumatic cylinder, that dampens pivoting movement of the blade housing 20. The cylinder 42 may hold the blade housing 20 in the pivoted-up position and may assist the user in gradually moving the blade housing 20 down during cutting movement.

The rotating plane of the first and second wheels 24 and 30 is tilted relative to the pivoting and cutting direction of the forward portion 34 of the blade 32. To ensure that the forward portion 34 of the blade 32 is correctly positioned for cutting the work piece, the band saw blade 32 is twisted at the forward portion 34 by blade guides 44 and 46. The blade guide 46 guides the forward portion 34 of the blade 32 from a position at which its width is at an angled orientation relative to the stationary work table 16 as it passes around the perimeter of the second wheel 30 to position at which its width is at a vertical orientation relative to the stationary work table at the forward cutting portion 34 of the blade 32. The blade guide 44 twists or guides the forward portion 34 from the vertical width orientation to the angled width orientation as the blade 32 extends from the forward portion 34 onto the perimeter of the first wheel 24.

To support longer work pieces, a work table extension 48 is connected to the stationary work table 16. The work table extension 48 includes a work piece support surface 50 at the same level at the top surface 52 of the stationary work table 16 and is positioned so that the work piece support surface 50 of the work table extension 48 is adjacent to the top surface 52 of the stationary work table. 16. The work table extension 48 may abut against the stationary work table 16 or may be spaced from the stationary work table 16, such as by a small gap. The work table extension 48 may support the work piece prior to, during, and after cutting to insure that a long work piece does not tilt or move during cutting, for example. The work table extension 48 extends from the stationary work table 16 in a first direction. A work piece support 54 may be mounted to extend from the stationary work table 16 in an opposite or second direction. The work table extension 48 as shown in FIG. 1 is mounted to the saw 10 in a position for horizontal cutting operation.

Figure 2:
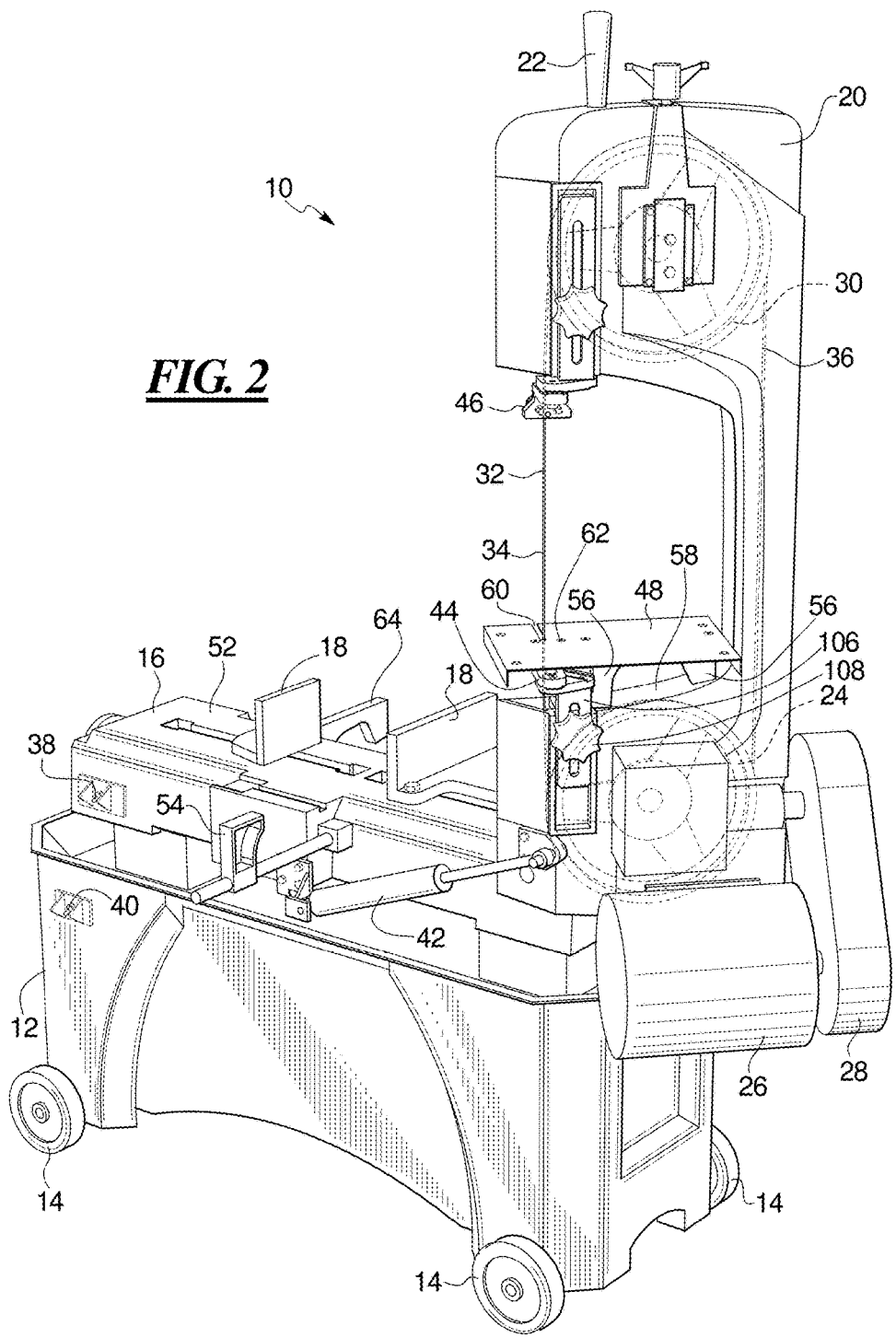
FIG. 2 is a schematic diagram of a top, front, right side perspective view of the band saw of FIG. 1 configured for use in a vertical cutting position.

As shown in FIG. 2, the band saw tool 10 may be configured for vertical cutting operation. The base 12 with the wheels 14 and the stationary work table 16 remain in a horizontal position. The blade housing 20 is pivoted to a vertical orientation and is locked into place. The cylinder 42 dampens movement between the two positions of the blade housing 20 at which the saw is used. The motor 26 and transmission 28 move with the blade housing 20. The forward portion 34 of the band saw blade 32 is no longer twisted from the orientation that extends over the wheels 24 and 30 but are supported by the blade guides 44 and 46 in a non-twisted position.

The work table extension 48 that was mounted adjacent to the stationary work table 16 in the horizontal cutting position of FIG. 1 is moved to a position to support a work piece for cutting in the vertical cutting position shown in FIG. 2. The work table extension 48 is supported on a bracket 56 that is mounted to an inner surface 58 of the blade housing 20. The bracket 56 supports the work table extension 48 in a horizontal position when the blade housing 20 is in the vertical cutting position. The work table extension 48 includes a slot 60 through which the blade 32 extends. The forward portion 34 of the blade 32 extends through the work table extension 48 so that a the work table extension 48 may support a work piece as it is being cut by the saw blade 32. The work table extension 48 also includes several openings 62 for receiving screws or other fasteners to hold the work table extension 48 to the bracket 56.

In the illustrated example, the bracket 56 includes two bracket legs that extend to the inner surface 58. A single bracket 56 may support the work table extension 48 in the vertical cutting position. The work table extension 48 may be supported by two or more brackets when mounted in the horizontal cutting position. One of the brackets 56 is used to mount the work table extension 48 to the blade housing for the vertical cutting position. The other bracket 64 remains attached to the side of the work table 16 in the illustrated example. In certain embodiments, more than two brackets may be provided to support the work table extension 48 in the horizontal cutting position, or a single bracket may be provided that support the work table extension 48 in the horizontal cutting position. In certain embodiments, two or more brackets may be provided to support the work table extension 48 in the vertical cutting position.

Figure 3:
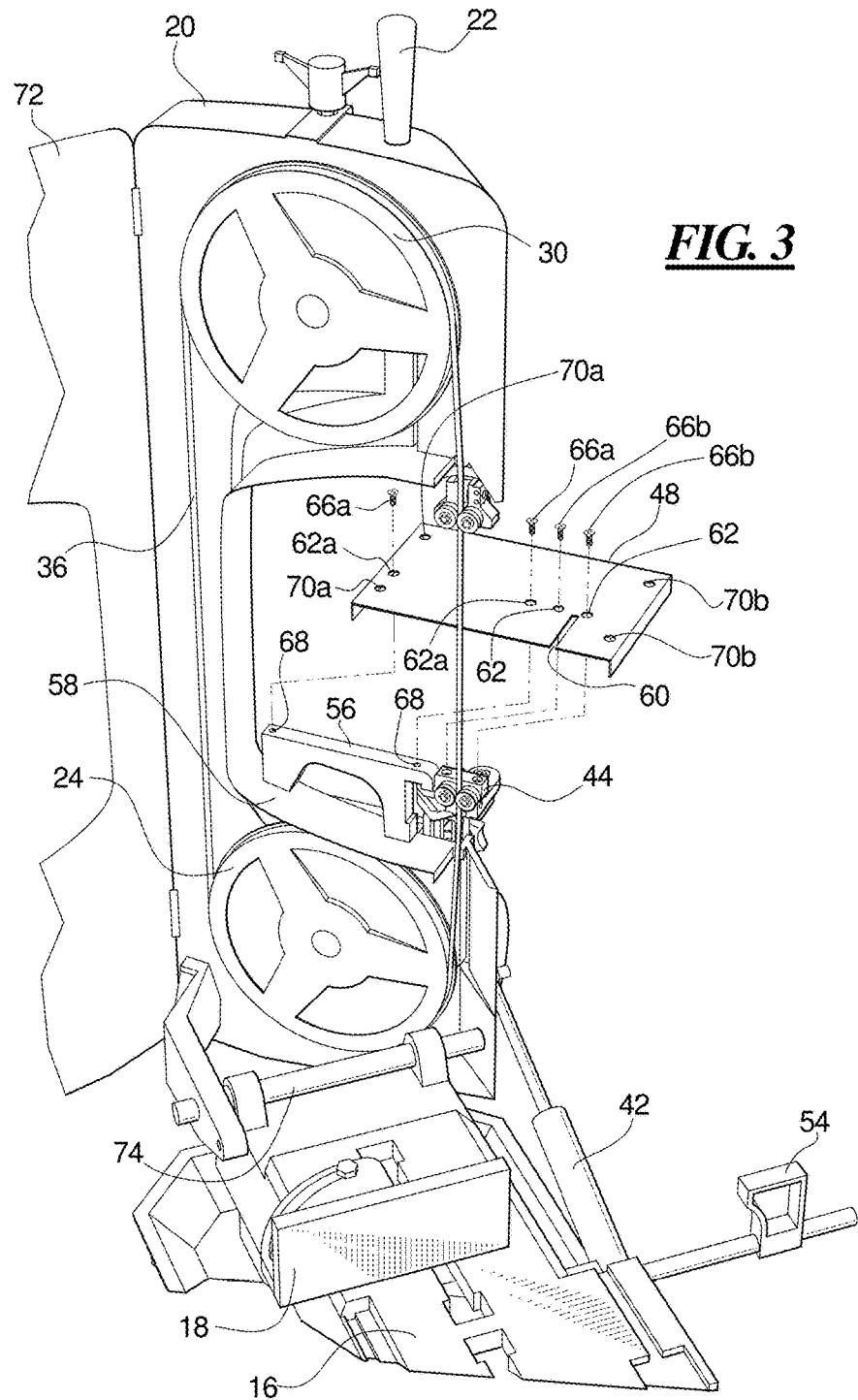
FIG. 3 is a fragmentary, partially exploded view of the band saw of FIG. 2, showing a work table being attached to the band saw.

FIG. 3 shows the work table extension 48 being mounted to the bracket 56 on the inner surface 58. The work table extension 48 and the bracket 56 have been removed from their positions adjacent to the work table 16 on the base 12 of the saw. If not already separated from one another, the bracket 56 and work table extension 48 are separated from one another. The bracket 56 is mounted to the inner surface 58 of the blade housing 20 and is connected to the blade guide 44. The bracket 56 may be mounted to the inner surface 58 by screws, by pins or other extensions fitting into openings or recesses, or by other fasteners. In certain embodiments, the legs of the bracket 56 rest on the inner surface 58 and may not be provided with fasteners.

The work table extension 48 is fastened to the bracket 56 by screws 66a extending through a first pair of holes 62 in the work table extension 48 and is fastened to the blade guide 44 by screws 66b extending through a second pair of holes 62b in the work table extension 48. The holes 62a and 62b are in line with one another in the illustrated embodiment. The holes 62b are on either side of the slot 60 in the illustrated embodiment. When the work table extension 48 is fastened in place with the screws 66a and 66b, it is held in the position shown in FIG. 2 and may be used to support work pieces in the vertical cutting position.

The bracket 56 of the illustrated embodiment includes two threaded bores 68 at the top edge. The screws 66a are threaded into the bores 68 to fasten the work table extension 48 to the bracket 56. In the vertical cutting position, the screws 66*a* extend through the openings 62*a* in the work table extension 48 and into the threaded bores 68 in the bracket 56. When the work table extension 48 is repositioned to the horizontal cutting position, the screws 66*a* are inserted through openings 70 in the work table extension 48. The openings 70 are positioned along the opposite edges of the work table extension 48. One pair of openings 70*a* is arranged for connection to the threaded bores 68 of the bracket 56 using the screws 66*a*. The other pair of openings 70*b* is arranged for connection to threaded bores in the other bracket 64 using the screws 66*b*. Of course, which bracket 56 or 64 is connected by which pair of screws 66*a* or 66*b* to which pair of openings 70*a* or 70*b* may be changed without departing from the invention.

FIG. 3 shows a door 72 (in fragmentary view) in an open position to reveal the wheels 24 and 30 with the blade 32 extending about both wheels. The door 72 is to be closed prior to operation of the saw 10, in certain embodiments. A hinge 74 connects the blade housing 20 to the base 12 for pivoting movement between the vertical cutting position and the horizontal cutting position as well as for pivoting movement during horizontal cutting.

Figure 4:
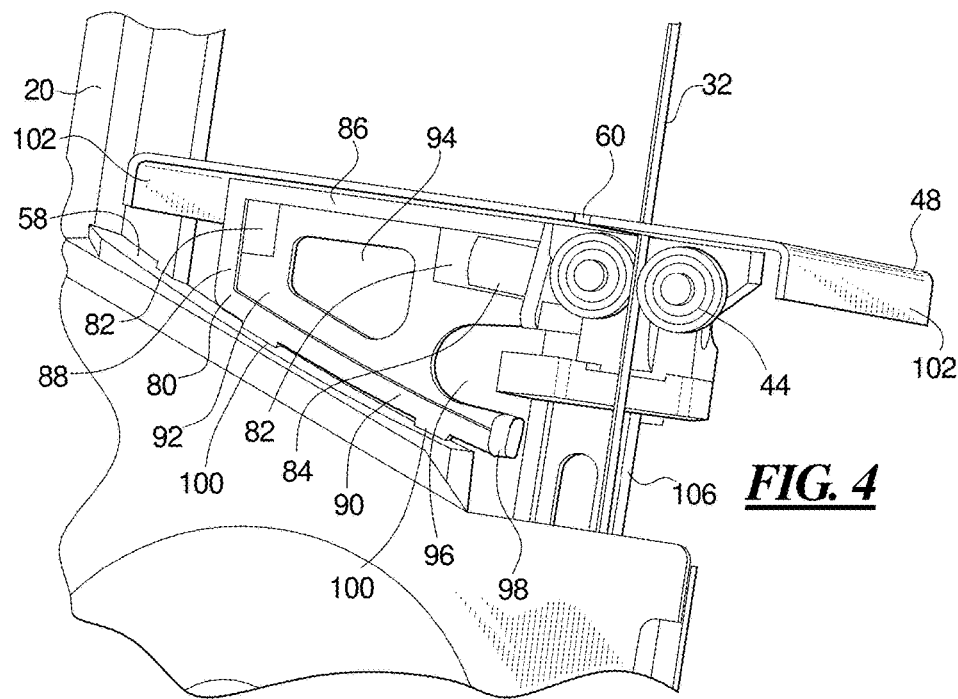
FIG. 4 is an enlarged front view of the work table and a mounting bracket supporting the work table on the band saw in a vertical cutting position.

Turning to FIG. 4, a second embodiment of a bracket 80 for supporting the work table extension 48 is shown. The work table extension 48 may be the same as in the first embodiment or may be different. The work table extension 48 is connected to a top edge of the bracket 80 for example by screws or other connectors. Cylindrical screw receiving portions 82 are provided in the bracket 80 into which threaded bores are formed for receiving the screws that connect the work table extension 48 to the bracket 80. A larger cylindrical screw receiving portion 84 is provided in the bracket 80 at a position adjacent to the blade guide 44 to receive a screw that connects the bracket 80 to the blade guide 44. The cylindrical screw receiving portions 82 have an axis transverse to the top surface of the bracket 80. The cylindrical screw receiving portion 84 has an axis parallel to the top surface of the bracket 80.

The bracket 80 includes a top perimeter flange 86 that extends along the top of the bracket 80, a side perimeter flange 88 that extends along a short side of the bracket 80, and a bottom perimeter flange 90 along a bottom edge of the bracket 80. A web 92 extends between the perimeter flanges 86, 88 and 90. In the illustrated embodiment, the web 92 includes an opening 94 through the web 92 and a notch 96 at the end. The notch 96 is disposed between the large cylindrical screw receiving portion 84 and a bottom support 98. The bottom perimeter flange 90 includes two raised portions 100. The raised portions 100 extend from the perimeter flange 90 into contact with the inner surface 58 of the blade housing 20. The raised portions 100 may bear against the inner surface 58 or be fastened to the inner surface 58.

The work table extension 48 of the illustrated embodiment includes the slot 60 through which the blade 32 extends. The opposite ends of the work table extension 48 are provided with downwardly extending flanges 102.

Figure 5:
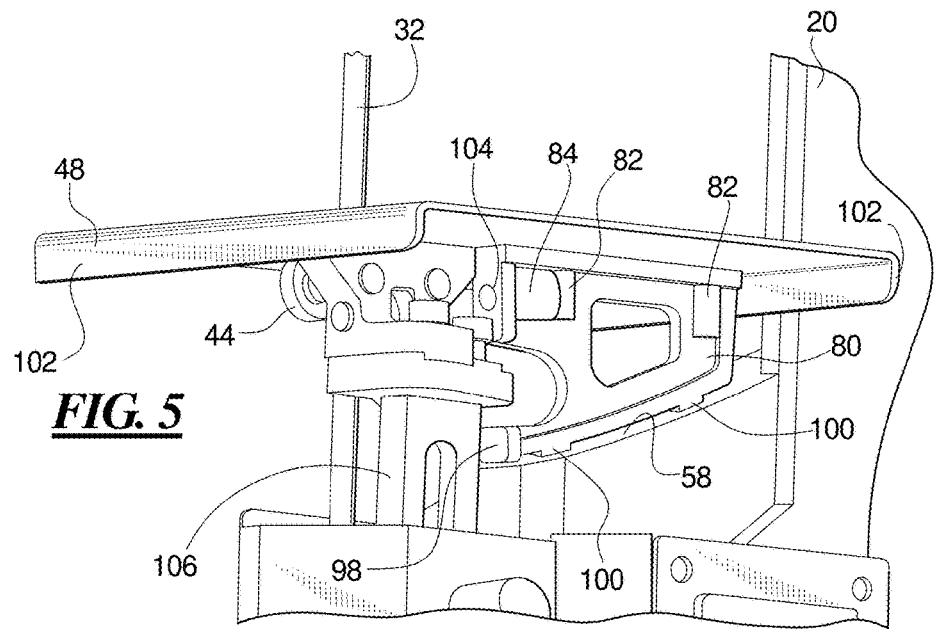
FIG. 5 is an enlarged back view of the work table and mounting bracket on the band saw in the vertical cutting position.

In FIG. 5, the bracket 80 has the large cylindrical screw receiving portion 84 abutting a fastening portion 104. The fastening portion 104 may be formed as part of the bracket 80 or may be part of the blade guide 44 so that a screw inserted through the fastening portion 104 and threaded into a threaded bore in the large cylindrical screw receiving portion 84 secures the bracket 80 to the blade guide 44. The blade guide 44 may be adjusted along the length of the blade 32 to position the raised portions 100 against the inner surface 58. Adjustment of the blade guide 44 may be accomplished by an adjustment channel 106 that permits the blade guide 44 to be adjusted to a plurality of positions. The adjustment channel 106 of certain embodiments is shown in greater detail in FIG. 2 including an adjustment knob 108 that extends through a slot in the adjustment channel 106 and into the blade housing 20. A user may loosen the adjustment knob 108 and position the adjustment channel 106 along the direction of the saw blade 32 so that the bracket 56/80 is at or against the inner surface 58. The adjustment channel 106 may be adjusted to other positions as well.

The work table extension 48 is may be fastened to the blade guide 44 and the bracket 80 by threading screws 66*a* and 66*b* through openings in the work table extension 48 and into the cylindrical screw receiving portions 82 and threaded openings in the top of the blade guide 44. The attachment of the work table extension 48 to the bracket 80/56 may be performed prior to or after attachment of the bracket 80 to the blade guide 44, and before or after adjustment of the adjustment channel 106 to position the bracket 80 onto the inner surface 58. These steps may be performed in any order.

As can be seen in FIGS. 4 and 5, the length of the bracket 80 extends in a direction transverse to the downwardly extending flanges 102 and transverse to the slot 60 when mounted in the vertical cutting position. When the bracket 80 and work table extension 48 are moved to the horizontal cutting position, the length of the bracket 80 extends generally parallel to the downwardly extending flanges 102 and the slot 60.

Figure 6:
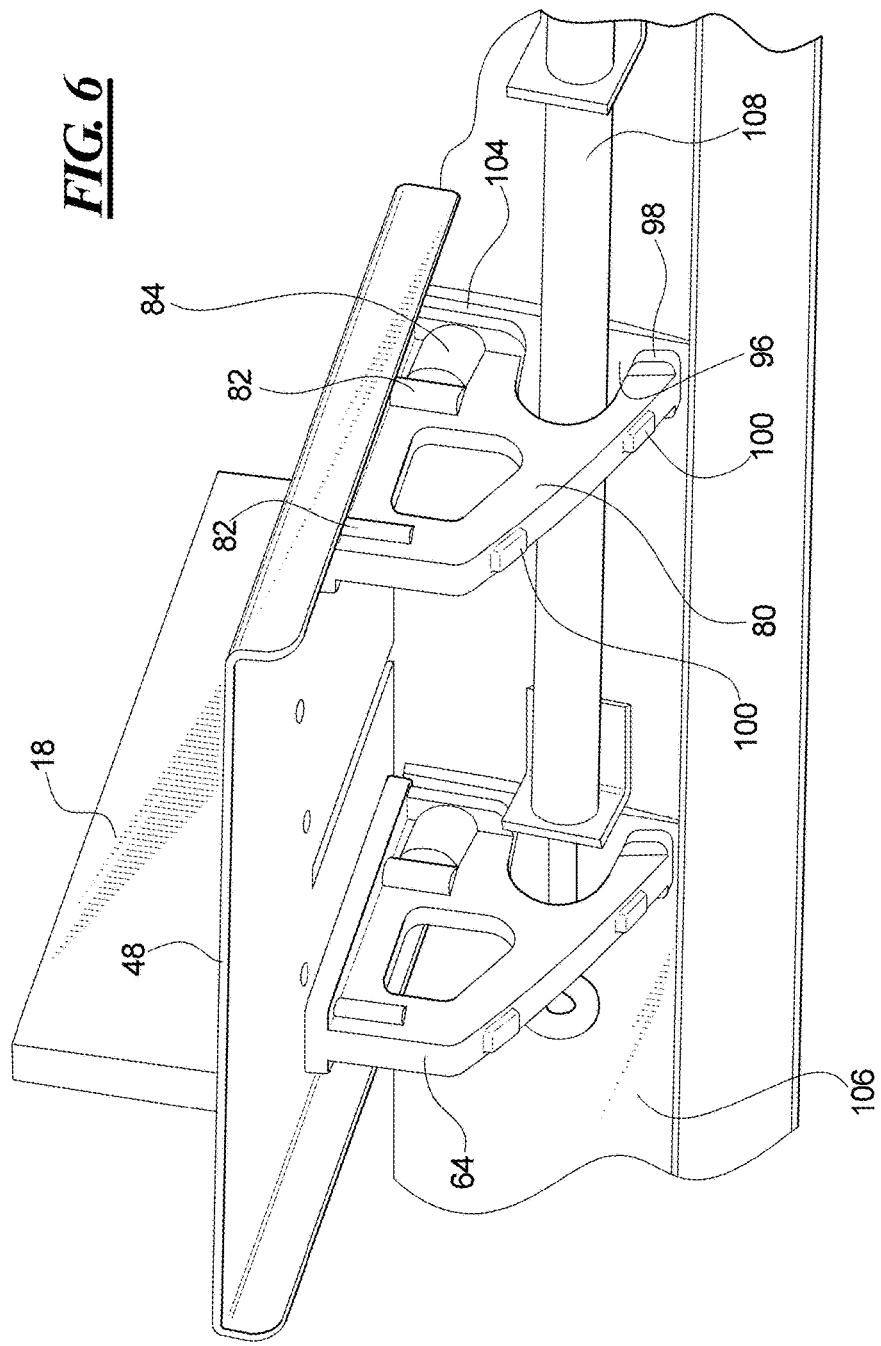
FIG. 6 is an enlarged front view of the work table and mounting brackets mounted on the band saw for use in the horizontal cutting position.

Turning to FIG. 6, the work table extension 48 and bracket 80 have been removed from the blade guide 44 and the have been moved to a position adjacent the stationary work table 16. The screws 66*b* that connect the work table extension to the blade guide 44 have been removed to permit removal of the bracket 80 and work table extension 48 from the position at the blade guide 44. The bracket 80 has been unfastened from the work table extension 48 by removing the screws 66*a* that connect though the holes 62*a* of the work table extension 48. The bracket 80 is fastened to a side wall 106 of the stationary work table 16. For example, a threaded bolt may extend from the side wall 106 into the large cylindrical screw receiving portion 84 to hold the bracket 80 to the side wall 106. The threaded bolt 106 may be threaded onto the bolt by rotating the bolt from within the stationary work table 16 or by rotating the cylinder portion 84 in the bracket 80 onto a stationary bolt. Other means for fastening the bracket 80 to the side wall 106 are also possible and are within the scope of this invention.

The work table extension 48 is fastened onto the bracket 80, for example, by screws 66*a* or 66*b* extending through the holes 70*b* (see FIG. 3) and into the cylindrical screw receiving portions 82 in the bracket 80. The work table extension 48 is also attached to the other bracket 64 which may have been left in place at the side wall 106 or may be attached to the side wall 106 when the work table extension 48 is moved to the horizontal cutting position. In certain embodiments, the bracket 80 and the other bracket 64 are identical so that either could be removed from the side wall 106 and used to support the work table extension 48 in the vertical cutting position. Similarly, either bracket 80 and 64 may be moved from the vertical cutting position at the blade guide 44 to either position on the side wall 106.

In certain embodiments, an elongated bar 108 is provided on the side wall 106. Each of the brackets 80 and 64 are provided with the notch 96 that extends over the elongated bar 108 so that the brackets engage the side wall 106 at both the fastening portion 104 as well as at the bottom support 98. The same work table extension 48 part is used as the primary work table in the vertical cutting position and as an extension of the work table 16 in the horizontal cutting position. The same bracket 56 or 80 is used to support the work table extension in both the vertical cutting position and in the horizontal cutting position. The same screws that hold the work table extension 48 to the bracket 56 or 80 may be used in the vertical cutting position and in the horizontal cutting position. The change between the horizontal cutting position and the vertical cutting position is a simple matter of removing a few screws, moving a few parts, and reinserting the screws.

The two position work table is provided for a band saw that operates in either a vertical orientation or a horizontal orientation. The band saw includes a band shaped saw blade mounted on two wheels, one of which is driven. A housing encloses the wheels and the return length of saw blade extending between the wheels. The other length of blade is exposed for cutting. When the housing is in the vertical orientation, a work table is mounted on the housing to support work pieces while being cut by the exposed portion of the blade. The housing may be pivoted to a horizontal position so that the cutting edge of the blade is directed downward toward the top of a workpiece positioned on a horizontal surface. The housing is pivoted by the user to bring the running blade into contact with the workpiece so as to cut through the workpiece as the user pivots the housing to a horizontal position.

The work table must be removed from the housing to provide clearance for the horizontal position. The removed work table is attached to the base of the band saw to provide an extension of the horizontal work table surface so as to support longer work pieces when the saw is used in the horizontal position. The removable work table is provided with two support brackets when mounted on the base for horizontal position use, and a single support bracket when mounted on the housing for vertical position use. A user of the vertical/horizontal band saw can easily change the work table position to either orientation.

Although other modifications and changes may be suggested by those skilled in the art, it is the intention of the inventors to embody within the patent warranted hereon all changes and modifications as reasonably and properly come within the scope of their contribution to the art.

We claim:

1. A work table for use with a band saw that is operable alternatively in a vertical cutting position and a horizontal cutting position, comprising:
   a work table member having a work table surface, a slot defined in the work table member, and first and second fastening locations on the work table member; and
   a bracket being selectively fastenable to the first and second fastening locations to provide a first configuration of the work table member and the bracket when the bracket is fastened to the first fastening location of the work table member and to provide a second configuration of the work table member and the bracket when the bracket is fastened to the second fastening location of the work table member,
   wherein when the bracket and work table member are assembled in the first configuration the bracket is configured for mounting to the band saw such that the bracket supports the work table member in a first position on the band saw for use in-supporting a workpiece during cutting of the workpiece by the band saw in the vertical cutting position,
   wherein when the bracket and work table member are assembled in the second configuration the bracket is configured for mounting to the band saw such that the bracket supports the work table member in a second position on the band saw for use in supporting a workpiece during cutting of the workpiece by the band saw in the horizontal cutting position.

2. A work table as claimed in claim 1, wherein the band saw includes a stationary work table, and wherein when the bracket and work table member are assembled in the second configuration, the bracket is configured for mounting to the band saw such that the work table element is positioned adjacent to the stationary work table of the band saw for use as a work table extension of the stationary work table for supporting a workpiece during cutting of the workpiece by the band saw in the horizontal cutting position.

3. A work table as claimed in claim 1, wherein a band saw blade extends through the slot when the work table member is mounted for use in the vertical cutting position.

4. A work table as claimed in claim 1, wherein the bracket includes a top surface mounted to the work table member and a bottom surface opposite the top surface, the bottom surface is configured for contact with an inner surface of a blade housing of the band saw when mounted in the vertical cutting position.

5. A work table as claimed in claim 1, wherein the band saw includes a stationary work table, and wherein the bracket includes a top surface mountable against to the work table member and a perpendicular surface, the perpendicular surface is configured for contact with a side wall of a stationary work table of the band saw when mounted in the horizontal cutting position.

6. A work table as claimed in claim 1, further comprising:
   a further bracket configured for attaching the work table member to the band saw when used in the horizontal cutting position, the work table member being mounted on the bracket and the further bracket when in the horizontal cutting position.

7. A band saw, comprising:
   a base;
   a stationary work table mounted to the base, the stationary work table having a top surface;
   a blade housing mounted to the base for pivoting movement between a vertical position and a horizontal position;
   first and second wheels mounted to the blade housing;
   a band saw blade mounted on the first and second wheels;
   a motor connected to at least one of the first and second wheels so as to drive the band saw blade for cutting workpieces in each of the vertical and horizontal positions of the blade housing; and
   a movable work table having a workpiece support surface, the movable work table being selectively mountable in a first position to support a first workpiece during cutting of the first workpiece by the band saw blade in the vertical position of the blade housing, the work table being selectively mountable in a second position to support a second workpiece during cutting of the second workpiece by the band saw blade in the horizontal position of the blade housing;
   wherein the movable work table is selectively mountable in the second position so that the workpiece support surface of the movable work table is co-planar with the top surface of the stationary work table for supporting a workpiece being cut in the horizontal position of the blade housing.

8. A band saw as claimed in claim 7, further comprising:
a bracket connected to the work table for selectively supporting the work table when in the first position and for selectively supporting the work table when in the second position.

9. A band saw as claimed in claim 8, wherein the bracket is connected to the work table and the blade housing in the first position and is connected to the work table and the base in the second position.

10. A band saw as claimed in claim 8, wherein the blade housing includes an inner surface disposed between the first and second wheels, the bracket being mounted to the inner surface in the first position.

11. A band saw as claimed in claim 8, wherein the bracket is connected to the work table in a first orientation when the work table is mounted in the first position and is connected to the work table in a second orientation when the work table is mounted in the second position.

* * * * *